(12) United States Patent
Whitehurst et al.

(10) Patent No.: US 11,364,946 B1
(45) Date of Patent: Jun. 21, 2022

(54) DOUBLE DOLLY HAND CART SYSTEM

(71) Applicants: Nichole M Whitehurst, Wesley Chapel, FL (US); Gerald E. Whitehurst, II, Wesley Chapel, FL (US)

(72) Inventors: Nichole M Whitehurst, Wesley Chapel, FL (US); Gerald E. Whitehurst, II, Wesley Chapel, FL (US)

(*) Notice: Subject to any disclaimer, the term of this patent is extended or adjusted under 35 U.S.C. 154(b) by 0 days.

(21) Appl. No.: 17/553,797

(22) Filed: Dec. 17, 2021

Related U.S. Application Data

(60) Provisional application No. 63/272,680, filed on Oct. 28, 2021.

(51) Int. Cl.
*B62B 5/00* (2006.01)
*B62B 1/12* (2006.01)

(52) U.S. Cl.
CPC .............. *B62B 5/0089* (2013.01); *B62B 1/12* (2013.01); *B62B 5/0086* (2013.01); *B62B 2203/10* (2013.01)

(58) Field of Classification Search
CPC ... B62B 5/0086; B62B 5/0089; B62B 3/0612; B62B 3/0618
See application file for complete search history.

(56) References Cited

U.S. PATENT DOCUMENTS

| | | | | |
|---|---|---|---|---|
| 2,450,690 A * | 10/1948 | Robins | .................. | B62B 3/0625 280/43.1 |
| 2,598,489 A * | 5/1952 | Bayer | ...................... | B62B 1/14 187/244 |
| 3,486,650 A * | 12/1969 | Boone | .................. | B62B 3/0625 414/458 |
| 5,738,480 A * | 4/1998 | Butzen | ...................... | B62B 1/14 414/490 |
| 6,062,802 A * | 5/2000 | Aenchbacher | ............ | B62B 1/14 414/490 |
| 6,406,248 B1 * | 6/2002 | McGill | ...................... | B66F 9/06 414/634 |
| 6,530,740 B2 * | 3/2003 | Kim | ........................ | B62B 1/002 414/490 |
| 6,634,658 B2 * | 10/2003 | Larouche | .............. | B62B 5/0086 414/458 |
| 7,857,572 B1 * | 12/2010 | Thompson | ................ | B62B 1/14 414/458 |
| 8,550,476 B1 * | 10/2013 | Whinnery | ................. | B62B 1/12 280/47.27 |
| 8,770,598 B2 * | 7/2014 | Li | ............................ | B62B 1/12 280/47.27 |
| 9,511,702 B2 * | 12/2016 | Ross | ........................ | B60P 3/40 |

* cited by examiner

*Primary Examiner* — Jonathan Snelting
(74) *Attorney, Agent, or Firm* — Law Firm of Stuart S. Levy

(57) ABSTRACT

The invention relates to adding jacks to hand-operated dollys which allows a heavy household item to be lifted and moved around, as needed. The system includes two separate dollys facing each other. In use, the double dollys face each other. Each dolly includes a jack support plate atop movable wheels that are several inches in diameter. A jack is provided to lift the item to be moved off the ground. Each dolly also includes a dolly frame with a ledge which raises the height of the item being lifted, in accordance with movement of the jack. The double dolly includes straps connect the dollys, with the item to be moved secured between the two dollys. This stabilizes the item being lifted and moved.

17 Claims, 11 Drawing Sheets

DOUBLE DOLLY HAND CART SYSTEM

CROSS REFERENCE TO RELATED APPLICATIONS

This patent application claims priority from provisional patent application 63/272,680. Titled: Double Dolly Hand Cart System, filed Oct. 28, 2021.

FEDERALLY SPONSORED RESEARCH

None

BACKGROUND

The invention relates to the general field of transportation of most household items, supporting up to several hundred pounds. Specifically, the invention relates to adding jacks to hand operated dollys and using plural dollys with jacks together to lift and move a single heavy item, which allows a heavy household item to be lifted and moved around, as needed, through the use of a double dolly hand cart system.

DESCRIPTION OF THE RELATED ART

In the current state of the technology, related items currently on the market include hand trucks without lifting capacities and forklifts for commercial use. A hand truck, also known as a dolly, stack truck, trundler, box cart, sack barrow, cart, sack truck, two-wheeler, or bag barrow, is an L-shaped box or product-moving handcart with handles at one end, wheels at the base, with a small ledge to set objects on, flat against the floor when the hand-truck is upright.

In operation of the current state of the art, objects to be moved are tilted forward, the ledge is inserted underneath them, and the objects to be lifted are allowed to tilt back and rest upon the ledge and be balanced on the ledge as well as the dolly frame supported on the flat ledge at the bottom of the dolly that extends upward from the ledge to help keep the item to be moved in place. The individual operating the current state of the art system is responsible for tilting the dolly backwards just the right amount in order for the weight of the product being lifted and moved to be in a balanced position; allowing otherwise bulky and heavy objects to be easily moved. A problem of the current state of the art is that in response to an object to be moved being heavy or bulky, the object to be lifted may tip backwards and push the dolly backwards into the individual using the dolly, which may readily injure the person using the dolly. In some situations, this may result in the individual being severely injured or even killed. From all of the above, a need exists to overcome the above-described problems associated with the current state of the art.

SUMMARY OF THE CLAIMED EXEMPLARY EMBODIMENTS

The double dolly hand cart system is designed to create an ease of use and safe system for moving heavy household items; such as furniture, refrigerators, washing machines, safes, etc.

The double dolly hand cart system includes two separate dollys (also referred to as hand carts) facing each other with one dolly being a primary side of the hand cart system and the other dolly being labeled as a secondary side of the hand cart system. In use, the double dollys face each other. Each dolly includes a jack support plate, movable wheels that are six inches, more or less, in diameter; a jack, along with a crank and a hitch attached to lift the item to be moved off the ground. Each dolly also includes a dolly frame with a ledge which raises the height of the item being lifted, in accordance with movement of the jack. The double dolly includes straps connect the dollys, with the item being moved being located between the two dollys. This stabilizes the item being lifted and moved.

The double dolly is ready to use once both sides of the double dolly are placed on each side of the heavy/bulky household item to be moved; and then securing the straps to each side of each of the two dollys making up the double dolly. Once the item to be moved has been secured, the cranks are adjusted to lift the jack to the desired height, which is generally around six inches. The item being lifted and moved can readily be moved in a one-handed fashion, by a single operator, using the handle of the primary side dolly. Each of the primary and secondary dollys including a jack mechanism and a dolly mechanism. The jack mechanism includes a jack frame connected to a jack frame support plate. Secured on the jack frame support plate is the jack. The jack frame support plate rests upon a set of castors or wheels.

The dolly mechanism includes a dolly frame with a handle and a bottom ledge that rests on the ground and extends outwardly from the dolly frame to support the item being lifted and moved. The dolly frame is slidably connected to the jack frame; wherein raising of the jack causes the dolly frame to be lifted off the ground, such that the object to be lifted is raised up for movement to a desired location. In operation, both of the first and second dollys are placed with the dolly ledges facing each other, the object to be lifted and moved is placed between the ledges, the object to be lifted and moved is tilted at an angle and a dolly ledge is slid under the tilted object. This is repeated with the secondary dolly so that the object to be lifted is on top of both ledges; straps are applied to both dolly frames to keep the object to be moved in place; and the jacks are then lifted to raise the dolly ledges and the object to be moved; wherein one individual can move the object to a desired location. The invention further includes at least one dolly frame brace provided between portions of the dolly frame. Upper and lower guide braces are provided between the jack frame and the dolly frame. The upper and lower guide braces are fixed to the dolly frame and are slidable with respect to the jack frame and a connection is provided between the jack and the dolly frame brace. In one exemplary embodiment, the jack is lifted using a crank. In another exemplary embodiment the jack is lifted using push buttons. In this exemplary embodiment, the jack buttons are operated by a battery or an electrical plug in system. In one exemplary embodiment, the dolly frame has a curved top. In another exemplary embodiment, the dolly frame has a rectangular shape. In either exemplary embodiment, a second dolly frame brace is located above the dolly frame brace connected to the jack. The top of the dolly frame may extend backwardly. In addition, the primary and secondary dolly hand carts are nestable together to save space when not in use. The dollys nest together by providing a hole in the ledge at the bottom of the secondary dolly and a hole at the top of the frame in the primary dolly. The dollys are further nested by turning the secondary dolly upside down with the hole in the ledge overlying the hole in the top of the frame of the primary dolly and inserting a connector through both holes so that the two dollys remain nested in place.

BRIEF DESCRIPTION OF THE DRAWINGS

In FIG. 7, the secondary side dolly is turned upside down and rests on top of the primary side dolly.

DETAILED DESCRIPTION OF THE EXEMPLARY EMBODIMENTS

Figure 1:
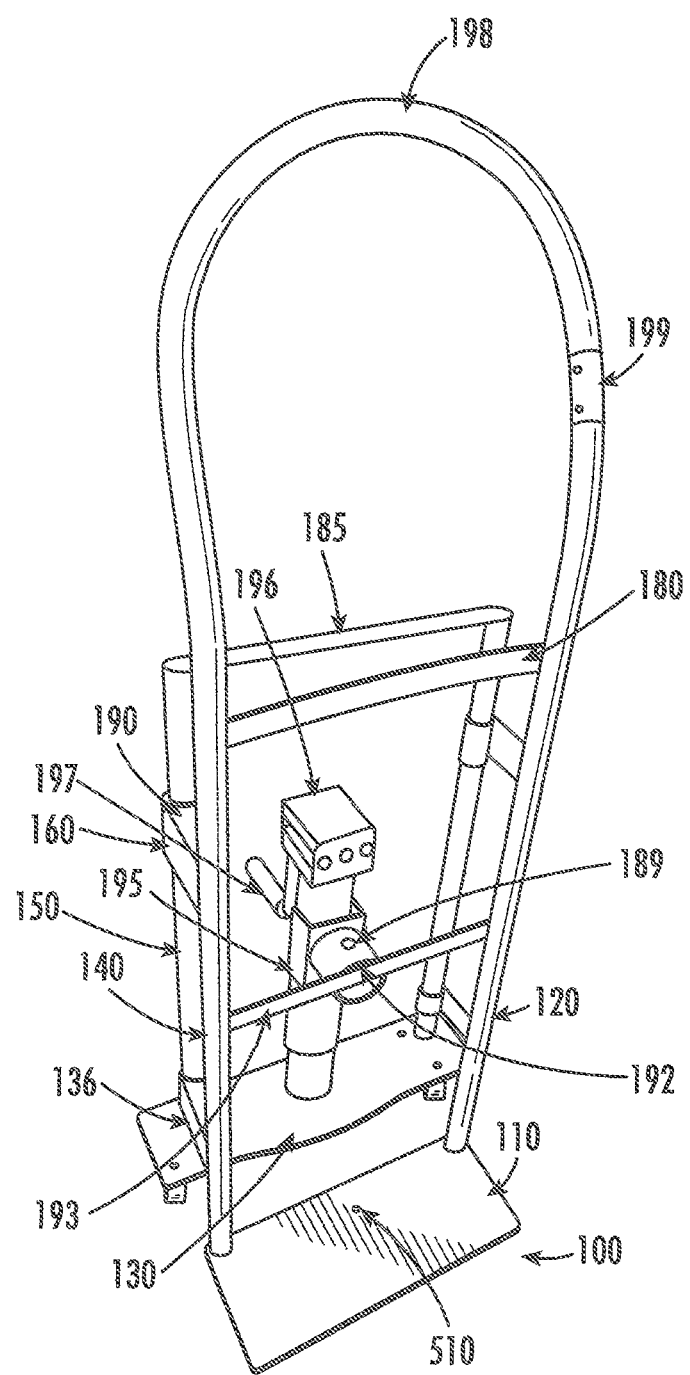
FIG. 1. illustrates a perspective view of the double dollys secondary side of the hand cart system.

For the purposes of promoting an understanding of the principles of the invention, reference will now be made to exemplary embodiments illustrated in the drawings; and specific language will be used to describe the same. It will nevertheless be understood that no limitation of the scope of the invention is hereby intended by this description. Any alterations and further modifications of the principles of the invention as described herein are contemplated; and would occur to one of ordinary skill in the art to which the invention relates.

Turning to FIG. 1, this figure shows a perspective view of the secondary double dolly, which is labeled 100, according to an exemplary embodiment. The secondary side of the double dolly 100 is configured as having a hand cart design with the top of the Dolly 198 being used as a stabilizing handle; and a ledge surface 110 on the bottom which carries the load. The secondary double dolly frame side 140 along with the secondary double dolly frame side 120 create the structural support for the jack plate frame 190 which is attached to the jack frame upper guide brace 160 and lower jack frame lower guide brace 136. There are two upper guide braces 160 and 190 on the jack frame 185 that are connected to the dolly frame 198, as shown in FIG. 1. These braces move up and down as the jack handle 197 is being cranked, allowing for the load resting upon the ledges 110 to be raised or lowered. The dolly frame also has an upper dolly frame brace 180 that provides added stability to the dolly frame. The top of the jack frame 185 creates the structural integrity of the jack frame with support from both sides of the jack frame 150, then continuing down to the bottom is the jack frame support plate 130 creating a jack frame structural support. The jack frame 185 is connected to the dolly frame 198 by means the jack frame upper guide brace 160 and to jack frame lower guide brace 136. The secondary dolly frame 198 may alternately include an exemplary embodiment of push buttons 199 that can be depressed to raise and lower the dolly Frame's 198 height instead of using crank 197, in order to raise or lower the ledges 110 on each of the dollys. The jack 195 includes the jack top 196 and the jack handle 197, which help to raise or lower the jack frame 185 from the dolly frame 198. Additionally, as illustrated in FIG. 1, at the front of jack 195 is a forwardly projecting cylinder 189, which is welded at 192 to a horizontal brace 193; such that when the crank 197 is turned, the cylinder 189 in the side of the jack opposite from the crank 197 of the jack is lifted, along with braces 160 and 190, along with the ledge 110 along with frame elements 120, 140, to lift the object to be moved.

Figure 2:
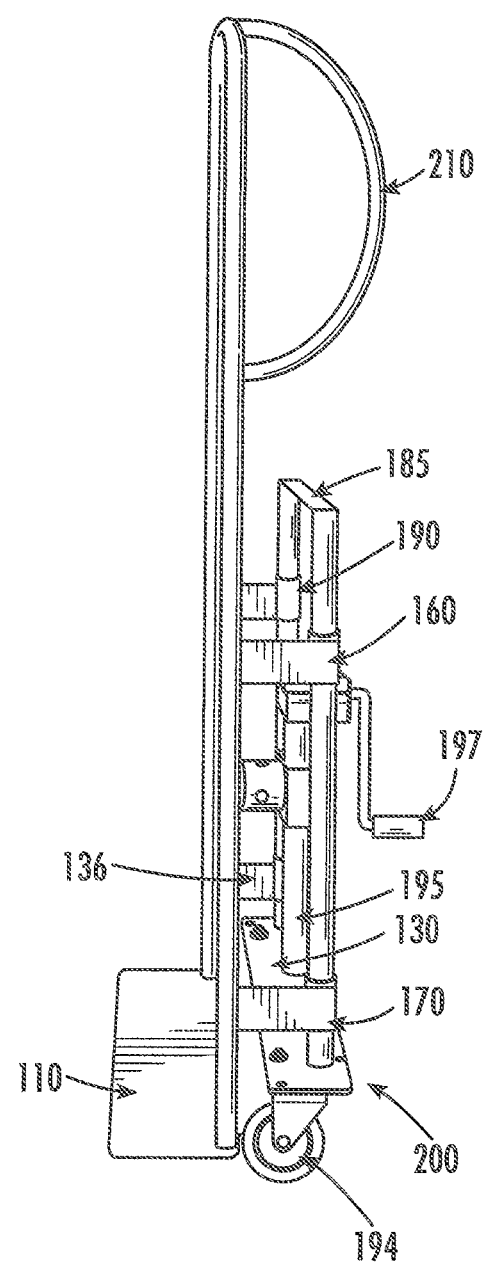
FIG. 2. illustrates a side view of the double dollys primary side of the hand cart system.

Turning to FIG. 2, this figure shows a side perspective of the double dollys primary unit 200. The dolly handle 210 assists the operator with a one-handed grip to move the double dolly to the desired location. The double dolly ledge 110 is used for placing the item to be moved upon the primary dolly. To lift the item to be moved by the double dolly off of the ground, the jack 195 and the Jack Handle 197 do the lifting and jack frame 185 holds the jack to the double dolly 200 for transport using the wheels/castors 194. The jack frame 185 includes an upper jack plate frame 190 and an upper guide brace 160. The jack frame 185 is connected to the dolly frame with the upper guides 190 and 160, as well as with the lower guides 136 and 170. Additionally, the jack frame 185 includes lower guide braces 136, which connects the dolly frame 198 to the Jack Frame 185.

Figure 3:
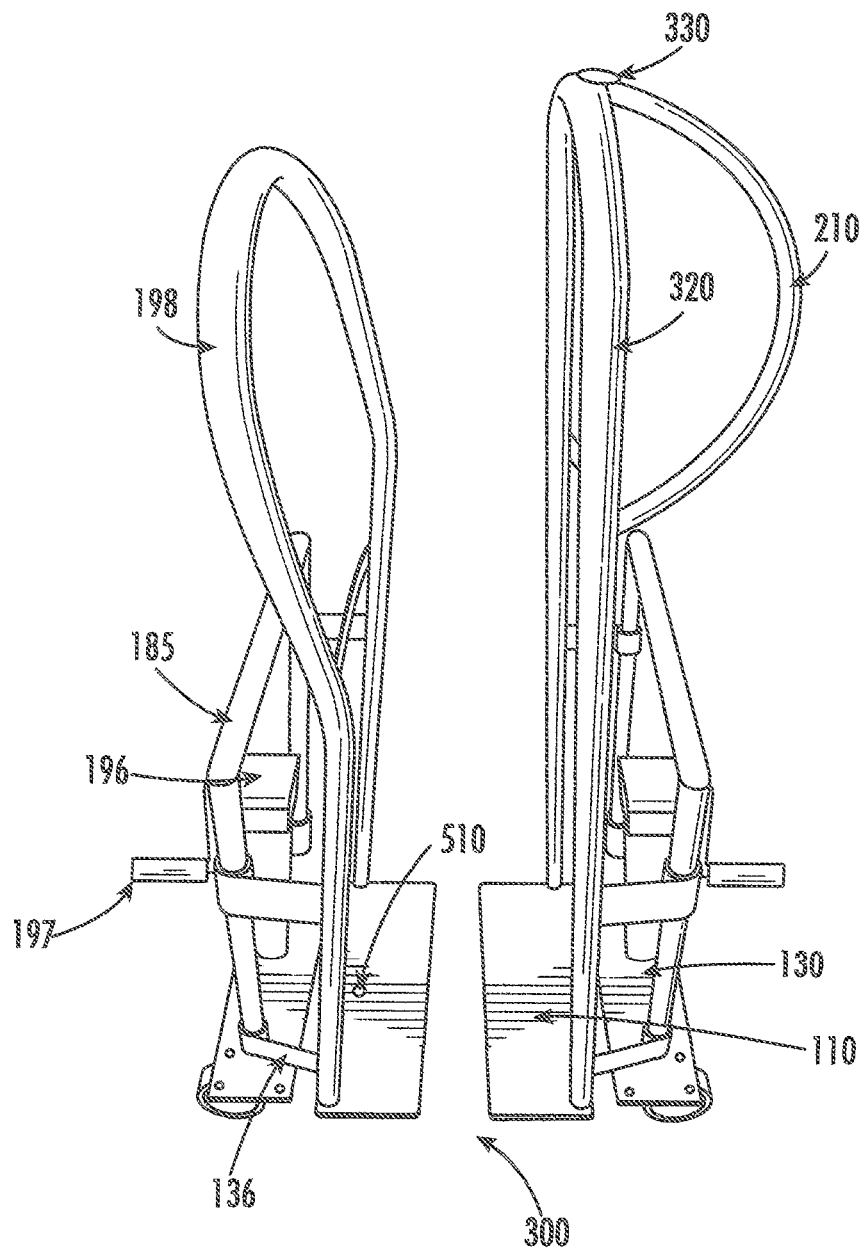
FIG. 3. illustrates a side view of both the primary and secondary sides of the double Dolly.

Turning to FIG. 3, This side view shows the complete double dolly unit 300 as it would work in combination to surround the item to be moved from two sides, as the item laid upon and between both ledges 110. The primary Dolly handle 210 controls the direction of both the primary Dolly 200 and the secondary Dolly 100. The item to be moved is placed against the primary Dolly front side 320 and against the secondary dolly frame 198. Once the item is in place, both sides utilize the jack 196 and jack handle 197 which is being supported by the jack frame support plate 130 and the jack frame top 185, in order to raise or lower the dolly frames of both the primary dolly 200 and the secondary dolly 100; and are attached to the dolly frame 198 by means of the jack frame upper guide braces 160 and lower guide braces 136. When the primary Double Dolly 100 is not in use, it can be readily stored with the secondary double dolly 200 turned upside down with the pin storage hole 510 (see FIGS. 1 and 5) lined up with the storage 1151 and hole 330 on the primary side. Once the holes 330 and 510 are aligned, the pin 1151 is inserted into the holes in both units for secure storage of the double dolly.

Figure 4:
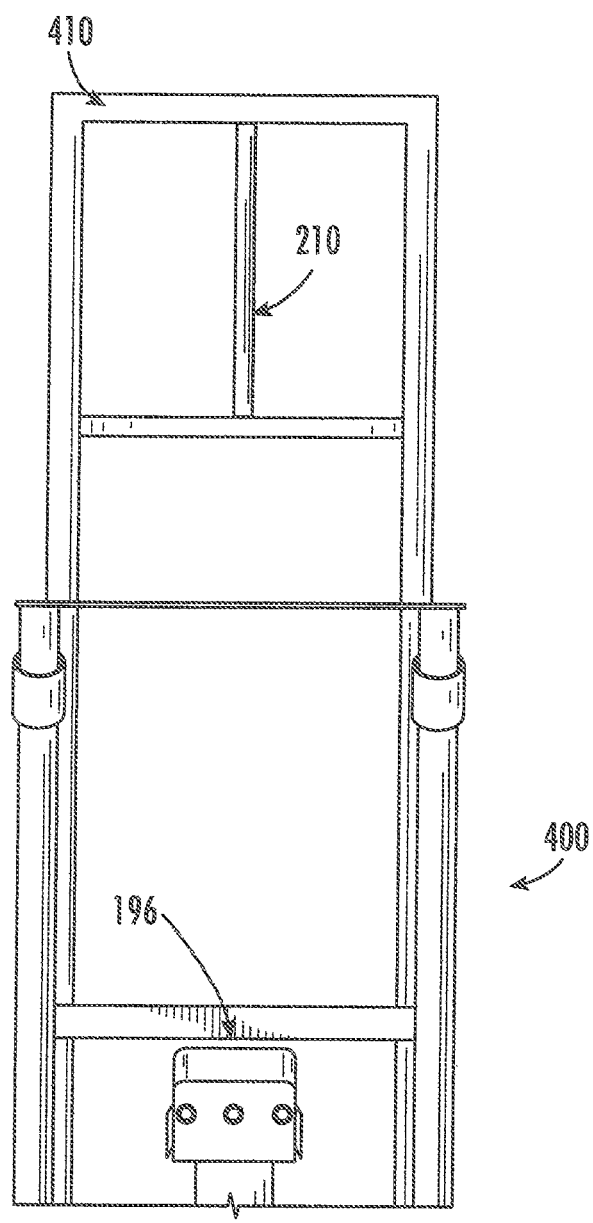
FIG. 4. illustrates a detailed view of the jack frame and jack, wherein the top of the primary double dolly is rectangular, instead of being curved as in FIG. 3.

Turning to FIG. 4, this figure represents an exemplary embodiment which modifies the rounded top of primary dolly 100 to become a rectangular top 410 in order to provide a stronger surface area to receive the hole 510 (FIG. 5) in the upside down ledge 110, as well as to better receive the ledge 110 in order to keep the dollys properly nested during storage.

Figure 5:
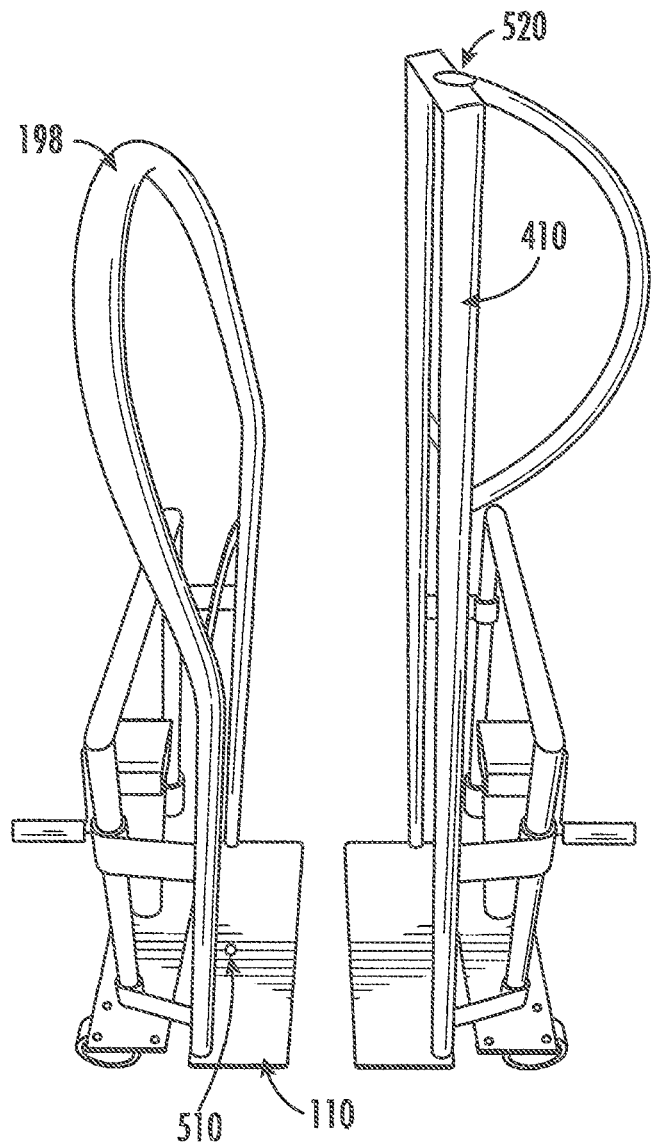
FIG. 5. illustrates an exemplary embodiment of both dollys where the primary dolly is the rectangular topped dolly of FIG. 4; and including a pin opening in the top of the primary Dolly and in the bottom of the secondary dolly; in order to enable nesting of the two dollys during storage of the invention.

Turning to FIG. 5, this exemplary embodiment provides a perspective illustration of a storage option for when the double dolly is not in use, In this embodiment, the double dollys can be stored with the secondary side 100 turned upside down with the pin storage hole 510 lined up with the storage pin 1151 and hole 330 of the primary dolly, in the embodiment with a curved top. Once the holes are aligned the pin 1151 (FIG. 11) is inserted through the hole 510 in ledge 110 of the frame of the secondary dolly and into hole 330 of the primary dolly for firm securement of both dollys for storage.

Figure 6:
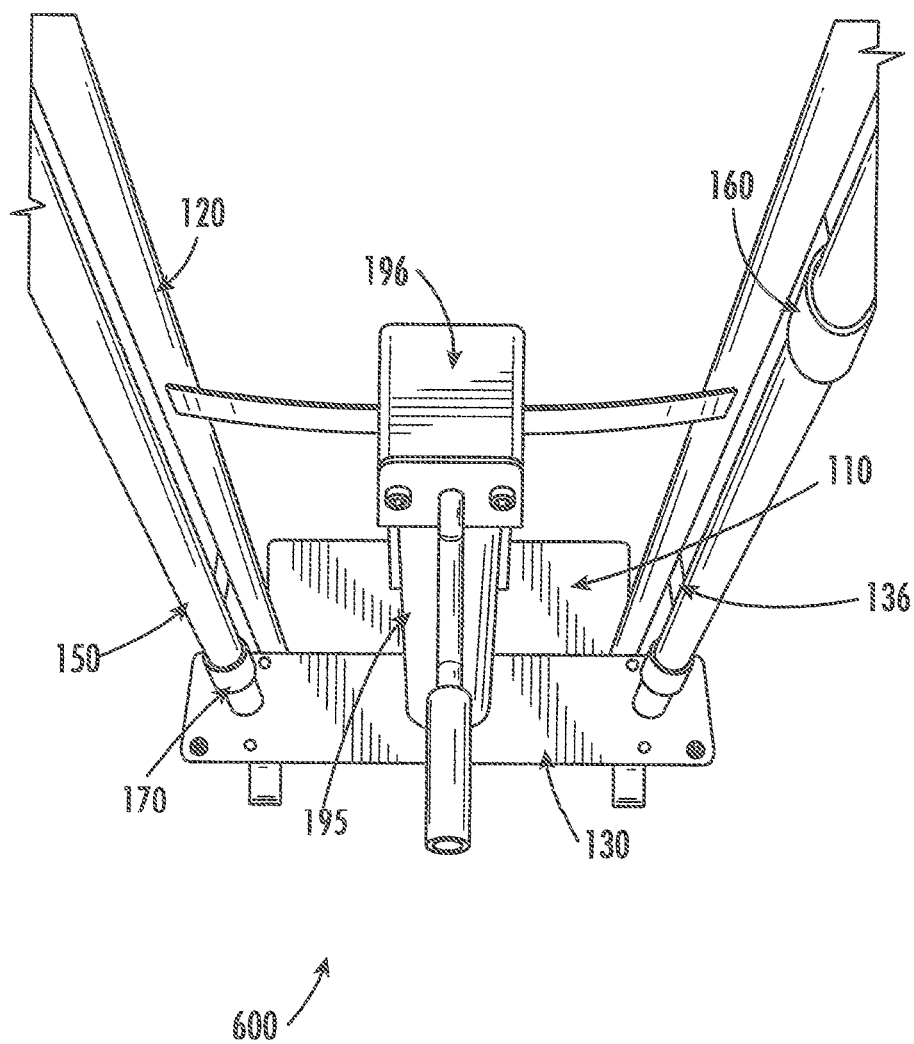
FIG. 6. illustrates a detailed view of the Jack assembly.

Turning to FIG. 6, element 600 represents a top perspective view of the jack and dolly assembly of FIG. 6. The dolly frame 120 is connected to the jack frame 150 using jack frame lower guide brace 136, jack frame upper guide brace 160, jack 195 and jack top 196 are secured upon the jack frame support plate 130.

Figure 7:
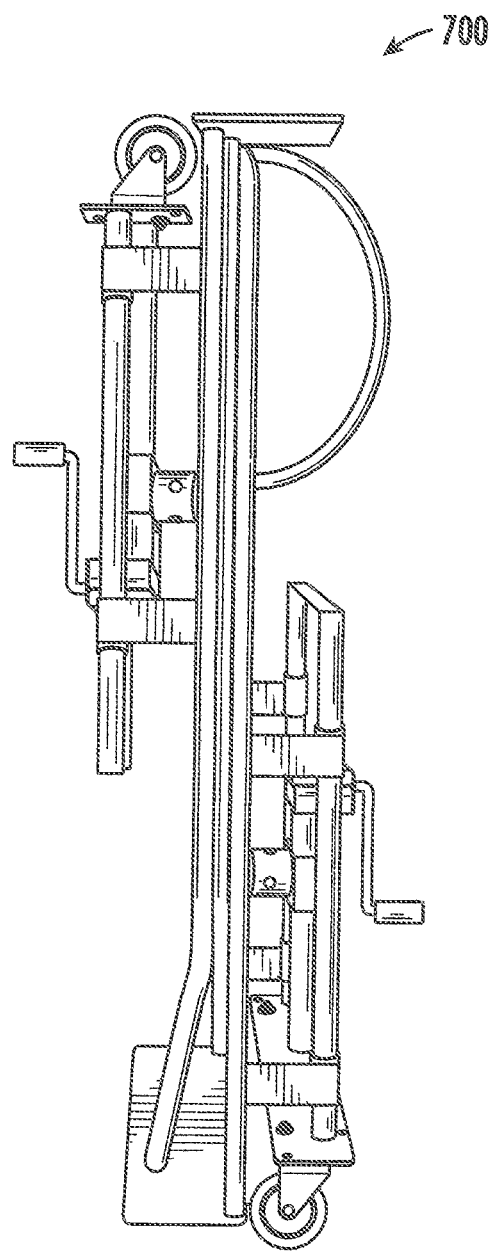
FIG. 7. illustrates the doubly dolly being stored in a nested position.

Turning to FIG. 7, this illustration shows a perspective view of the double dollys stored in a nesting position 700. In the nesting position, secondary dolly 100 is turned upside down and its ledge 110 is placed atop the primary upright dolly 200. In operation, to nest the two dollys, the secondary dolly 100 is turned upside down and the ledge 110 of the secondary dolly is placed on the rectangular top 410 of the primary dolly in such a manner that the hole 510 (FIG. 5) of ledge 110 of the secondary dolly is in alignment with the hole 520 of the primary dolly. At this point, the pin 1151 is placed into ledge 110 and passes through hole 510 in the ledge into hole 520 at the top of the primary dolly. The ring 1152 near or at the top of the pin 1151 prevents the pin 1151 from going past the opening 520 and into 410, in order to prevent the pin 1151 from falling into the top of the primary dolly.

Figure 8:
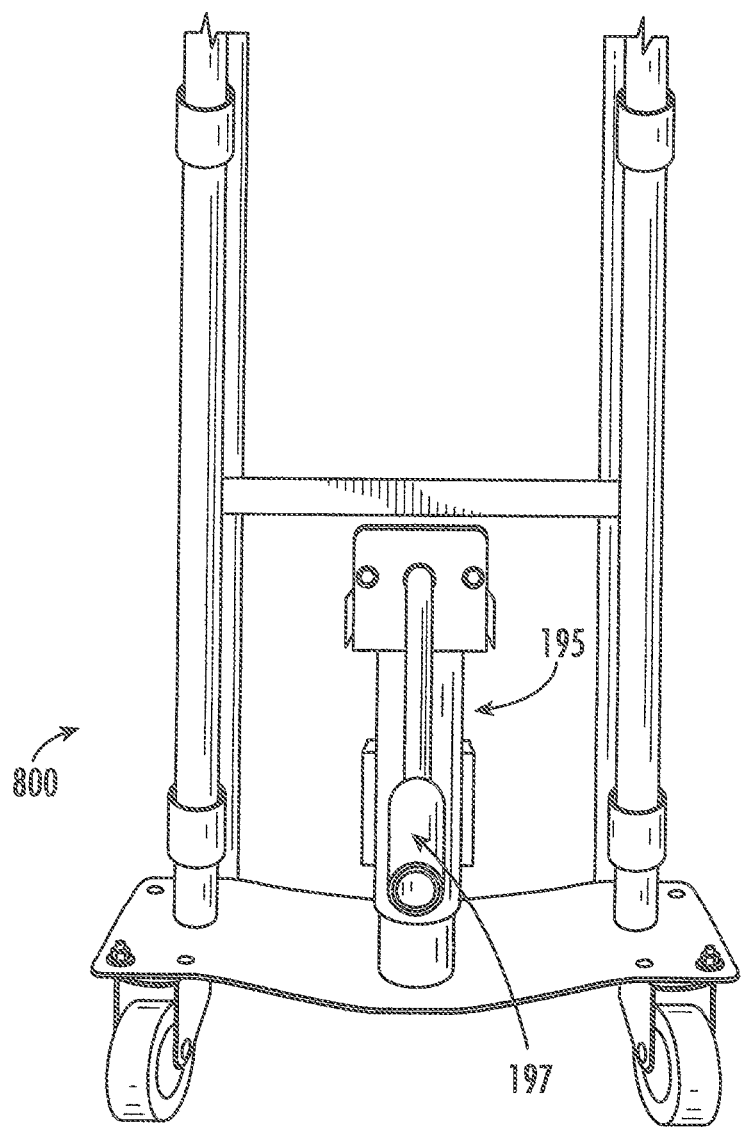
FIG. 8. Further illustrates the jack support plate and Jack used to support the load and maintain structural integrity of the dolly.

Turning to FIG. 8, This illustration represents the bottom half of a rear view of the jack frame 800 and jack 195. The jack frame support plate 130 is used to support the jack 195. Once the load is lifted, the operator can readily move the double dolly, one-handed, to its preferred location.

Figure 9:
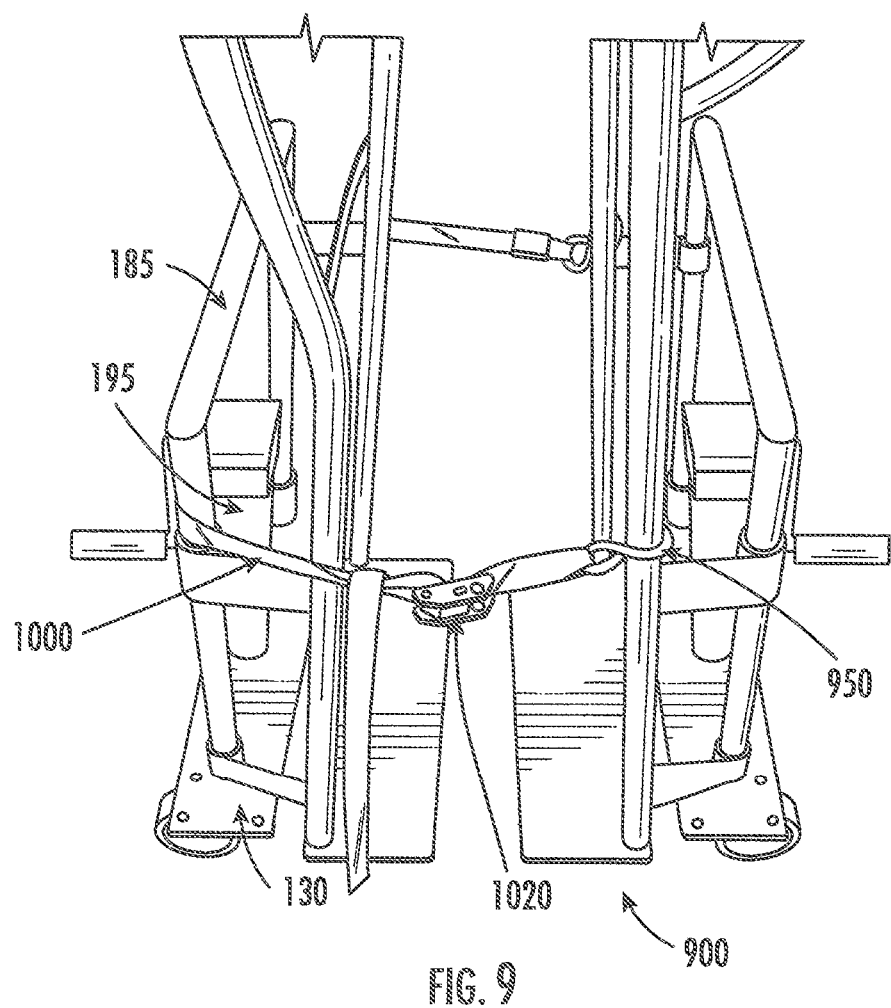
FIG. 9. illustrates the secure straps in place on the sides of the primary and secondary dollys, in order to secure a load being lifted and moved.

Turning to FIG. 9, this illustration represents the double dolly complete with a secure strap 1000. The double dolly unit has the jack 195 mounted on the jack support plate 130, which is being held by the jack frame 185. Each end of the strap 1000 are secured to each side of the primary dolly 200 adjusting the strap buckle 1020 to create tension around the double dolly 900 and the item that to be moved is centered between the primary dolly 200 and the secondary dolly 100. Once the strap 1000 has secured the load, the operator can adjust both jack handles 197 to raise the load to the desired height which may be 1 to 6 inches, or higher or lower. The load is raised on the dolly frames 198 as the jack frame guides 190, 160, and 136 glide along the jack frames 185. The load is then ready to be moved with the dolly handle 210, utilizing the castors/wheels 194.

Figure 10:
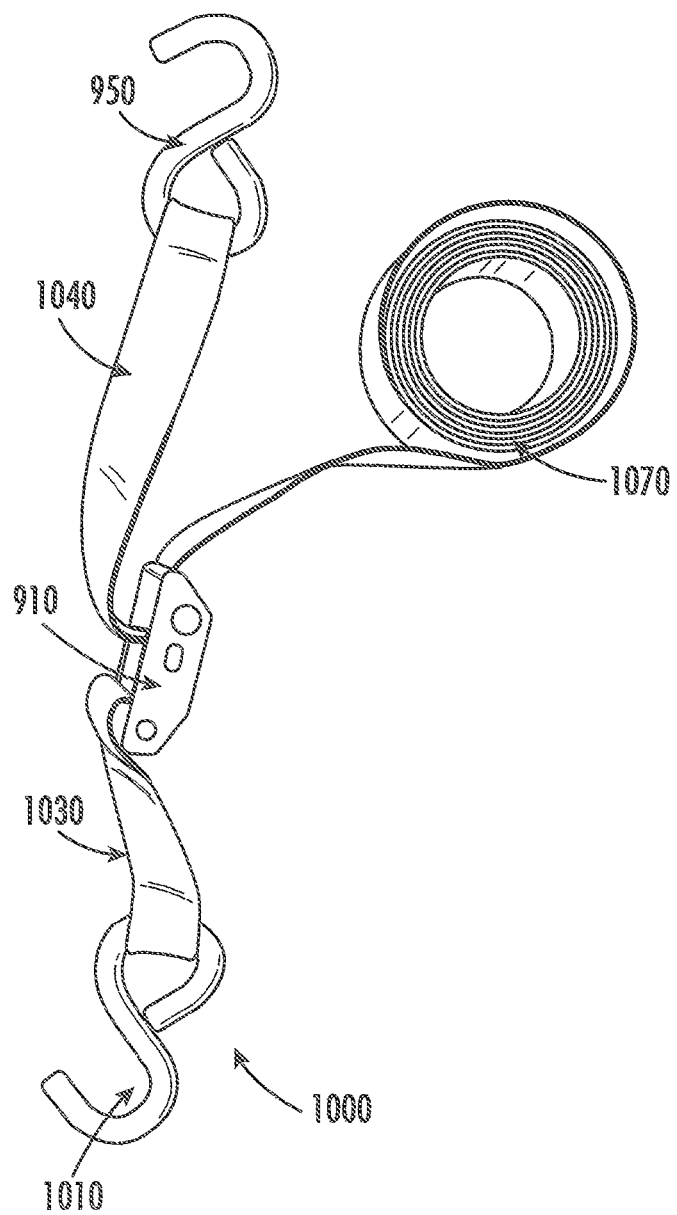
FIG. 10. illustrates the secure strap mechanism used on the sides of each of the primary and secondary dollys, to secure the load.

With regard to FIG. 10, this figure illustrates the strap assembly 1000. The strap 1000 is used to secure the load to be transported on the double dolly. The strap 1000 assembly is composed of two strap hooks on either end of the strap, namely strap hook 1010 and strap hook 1060. Attached to strap hook 1060 is an adjustable strap 1040 made out of a durable cloth-like or similar material. The adjustable strap 1040 goes through the inner buckle and comes out the other end 1070. When the strap is pulled from the other end 1070, it tightens the adjustable strap 1040. Attached to the other side of the buckle 1020 is the fixed strap 1030. The fixed strap 1030 always maintains the same length and is attached to strap hook 1010. Each end of the strap 1000 are secured to each side of the primary dolly 200 adjusting the strap buckle 1020 to create tension around the double dolly and the item that is being moved in the center of the primary dolly 200 and the secondary dolly 100. As shown in FIG. 10, the straps are attached on opposite sides of the double dolly.

Figure 11:
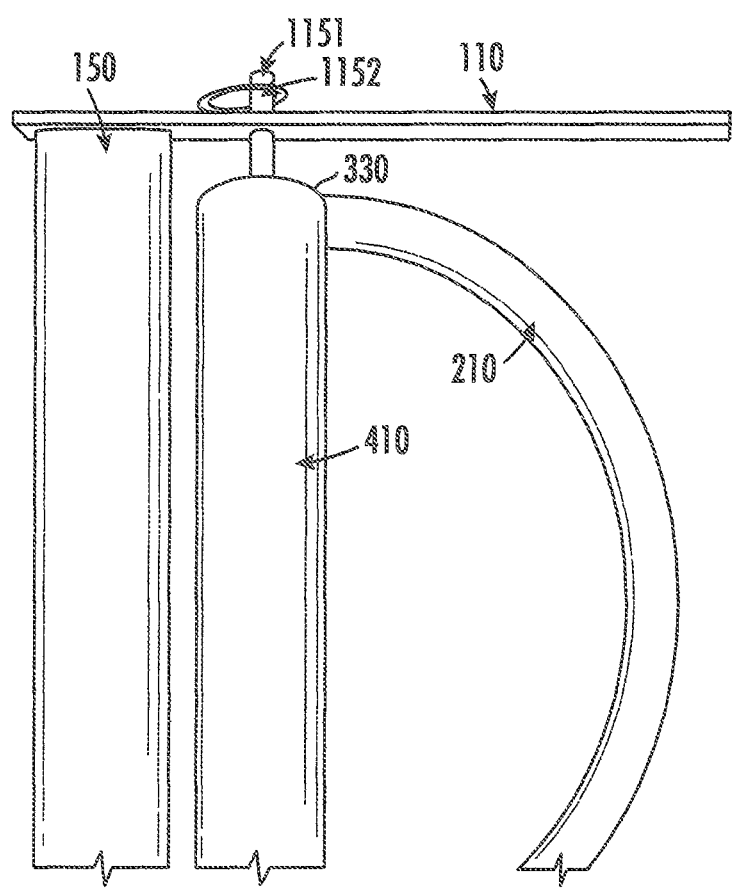
FIG. 11. Illustrates the pin used to keep the nested dollys in a secure position.

FIG. 11 illustrates the nesting position of the secondary dolly 100 being upside down on the top of the primary dolly 100 with the ledge 110 of the secondary dolly overlying the opening 330 in top 410 of the primary dolly and the opening 510 in the ledge of the secondary dolly, with pin 1151 extending through both openings so that the primary and secondary dare nested. In addition, the ring 1152 at or near the top of the pin 1151 prevents the Dollys from separating; unless the pin 1151 is removed.

Although different exemplary embodiments have been disclosed, the claims should not be construed to be limited to the exemplary embodiments. Rather, other modifications that would be understood by one of ordinary skill in the art are considered to be part of the invention. The invention is only limited by the scope of the appended claims.

What is claimed is:

1. A double dolly hand cart system, the system comprising:
   primary and secondary dolly hand carts;
   each of the primary and secondary dolly hand carts including both a jack mechanism and a dolly mechanism;
   the jack mechanism including a jack frame connected to a jack frame support plate;
   secured on the jack frame support plate is a jack;
   the jack frame support plate rests upon a set of castors or wheels;
   the dolly mechanism includes a dolly frame with a handle and a bottom ledge that extends outwardly from the dolly frame to support an object to be moved; the dolly frame is slidably connected to the jack frame; wherein raising of the jack causes the dolly frame to be lifted off the ground, such that the object to be moved is raised up for movement to a desired location;
   in operation, both of the primary and secondary dollys are placed with the dolly ledges facing each other, the object to be moved is placed between the dolly ledges, the object to be moved is tilted at an angle and a dolly ledge is slid under the tilted object to be moved; tilting of the object to be moved is repeated with the secondary dolly so that the object to be moved is on top of both ledges; straps are then applied to both dolly frames to keep in place the object to be moved; and
   the jacks are then lifted to raise the dolly ledges and the object to be moved; wherein one individual moves the object to be moved to a desired location;
   each of the primary and secondary dolly hand carts are nestable together to save space when not in use;
   each of the primary and secondary dolly hand carts nest together by providing a hole in the ledge at a bottom of the secondary dolly hand cart and a hole at a top of the frame in the primary dolly hand cart; and
   both the primary and secondary dolly hand carts are nested by turning the secondary dolly upside down with the hole in the ledge of the secondary dolly hand cart overlying the hole in the top of the frame of the primary dolly hand cart and inserting a connector through both holes so that the two dollys remain nested in place.

2. The double dolly hand cart system of claim 1, further including: at least one dolly frame brace is provided between portions of the dolly frame.

3. The double dolly hand cart system of claim 2, further comprising: upper and lower guide braces between the jack frame and the dolly frame on both sides of each double dolly hand cart.

4. The double dolly hand cart system of claim 3, further comprising the upper and lower guide braces are fixed to the dolly frame and are slidable with respect to the jack frame.

5. The double dolly hand cart system of claim 2, further providing a connection between the jack and the dolly frame brace.

6. The double dolly hand cart system of claim 5, further comprising a second dolly frame brace located above the dolly frame brace connected to the jack.

7. The double dolly hand cart system of claim 1, further comprising: the jack is lifted using a crank.

8. The double dolly hand cart system of claim 1, further comprising: the jack is lifted using push buttons.

9. The double dolly hand cart system of claim 8, further comprising: the jack push buttons are operated by a battery of an electrical plug-in system.

10. The double dolly hand cart system of claim 1, further comprising: both the top of both of the primary dolly frame and the top of the secondary dolly frame have fully curved tops.

11. The double dolly hand cart system of claim 1, further comprising: the top of the dolly frame has a rectangular shape.

12. The double dolly hand cart system of claim 1, further comprising: the dolly frame has a top which extends backwardly.

13. A double dolly hand cart system, the system comprising:
   primary and secondary dolly hand carts;
   each of the primary and secondary dolly hand carts including both a jack mechanism and a dolly mechanism;
   the jack mechanism including a jack frame connected to a jack frame support plate;
   secured on the jack frame support plate is a jack;
   the jack frame support plate rests upon a set of castors or wheels;
   the dolly mechanism includes a dolly frame with a handle and a bottom ledge that extends outwardly from the dolly frame to support an object to be moved; the dolly frame is slidably connected to the jack frame; wherein raising of the jack causes the dolly frame to be lifted off the ground, such that the object to be moved is raised up for movement to a desired location;
   in operation, both of the primary and secondary dollys are placed with the dolly ledges facing each other, the object to be moved is placed between the dolly ledges, the object to be moved is tilted at an angle and a dolly ledge is slid under the tilted object to be moved; tilting of the object to be moved is repeated with the secondary dolly so that the object to be moved is on top of both ledges; straps are then applied to both dollys and jack frames in order to keep the object to be moved in place and wherein the straps are applied before the jack is lifted;
   the jacks are then lifted to raise the dolly frames and the dolly ledges, along with the object to be moved, wherein one individual moves the object to a desired location by pushing or pulling the handle;
   each of the primary and secondary dolly hand carts are nestable together to save space when not in use;
   each of the primary and secondary dolly hand carts nest together by providing a hole in the ledge at a bottom of the secondary dolly hand cart and a hole at a top of the frame in the primary dolly hand cart; and
   both the primary and secondary dolly hand carts are nested by turning the secondary dolly upside down with the hole in the ledge of the secondary dolly hand cart overlying the hole in the top of the frame of the primary dolly hand cart with a connector through both holes so that the two dollys remain nested in place.

14. The double dolly hand cart system of claim 13, further including: at least one dolly frame brace is provided between portions of the dolly frame.

15. The double dolly hand cart system of claim 14, further comprising: upper and lower guide braces are fixed to the dolly frame and are slidable with respect to the jack frame.

16. The double dolly hand cart system of claim 14, further providing a connection between the jack and the dolly frame brace.

17. The double dolly hand cart system of claim 13, further comprising: upper and lower guide braces between the jack frame and the dolly frame on both sides of each double dolly hand cart.

* * * * *